US009115711B2

(12) United States Patent
Sieger et al.

(10) Patent No.: US 9,115,711 B2

(45) Date of Patent: Aug. 25, 2015

(54) METHOD FOR DETERMINING THE DISPLACEMENT OF A RADIAL PISTON MACHINE

(75) Inventors: Manfred Sieger, Freudenstadt (DE); Joerg Geis, Markdorf (DE)

(73) Assignee: ZF Friedrichshafen, AG, Friedrichshafen (DE)

( * ) Notice: Subject to any disclaimer, the term of this patent is extended or adjusted under 35 U.S.C. 154(b) by 603 days.

(21) Appl. No.: 13/515,530

(22) PCT Filed: Nov. 29, 2010

(86) PCT No.: PCT/EP2010/068392

§ 371 (c)(1), (2), (4) Date: Jun. 13, 2012

(87) PCT Pub. No.: WO2011/082890

PCT Pub. Date: Jul. 14, 2011

(65) Prior Publication Data

US 2012/0259580 A1 Oct. 11, 2012

(30) Foreign Application Priority Data

Dec. 17, 2009 (DE) ........................ 10 2009 054 876

(51) Int. Cl.

| | |
|---|---|
| ***G01C 9/00*** | (2006.01) |
| ***F04B 51/00*** | (2006.01) |
| ***F03C 1/40*** | (2006.01) |
| ***F04B 1/053*** | (2006.01) |
| ***F04B 1/07*** | (2006.01) |
| ***F04B 49/12*** | (2006.01) |

(52) U.S. Cl.

CPC ................ *F04B 51/00* (2013.01); *F03C 1/046* (2013.01); *F04B 1/0531* (2013.01); *F04B 1/07* (2013.01); *F04B 49/125* (2013.01)

(58) Field of Classification Search

CPC ............ F03C 1/046; F04B 51/00; F04B 1/07

USPC .......................................................... 702/151

See application file for complete search history.

(56) References Cited

U.S. PATENT DOCUMENTS

| | | | | |
|---|---|---|---|---|
| 5,133,418 | A * | 7/1992 | Gibson et al. | 175/45 |
| 5,628,188 | A * | 5/1997 | Kordak | 60/449 |
| 5,752,427 | A * | 5/1998 | Leutner | 91/497 |
| 5,878,648 | A * | 3/1999 | Dworak | 92/12.1 |
| 6,178,746 | B1 * | 1/2001 | Thoma et al. | 60/487 |
| 2003/0077173 | A1 * | 4/2003 | Franchet et al. | 416/30 |
| 2008/0184703 | A1 | 8/2008 | Gerth et al. | |

FOREIGN PATENT DOCUMENTS

| | | | |
|---|---|---|---|
| DE | 34 41 966 | A1 | 5/1986 |
| DE | 10 2004 048 174 | A1 | 4/2006 |
| DE | 10 2006 043 291 | A1 | 3/2008 |

(Continued)

*Primary Examiner* — Janet Suglo

*Assistant Examiner* — Stephanie Bloss

(74) *Attorney, Agent, or Firm* — Davis & Bujold, P.L.L.C.; Michael J. Bujold

(57) ABSTRACT

A method of determining displacement of a radial piston machine (1) having adjustable eccentricity (e). The radial piston machine (1) includes cylinders (2) arranged in a pivoting manner and a drive shaft that drives an eccentric (5). The rotation angle of the drive shaft is labeled as α and the pivoting angle of the cylinders (2) is labeled β. The pivoting angle β is measured and from the measured values for the pivoting angle β, the eccentricity (e) and hence the displacement (v) are calculated.

7 Claims, 2 Drawing Sheets

(56) References Cited

FOREIGN PATENT DOCUMENTS

| | | | |
|---|---|---|---|
| DE | 10 2007 003 800 | B3 | 5/2008 |
| EP | 1 624 185 | A2 | 2/2006 |
| EP | 1 901 040 | A2 | 3/2008 |
| GB | 2 167 138 | A | 5/1986 |
| WO | 99/17021 | A1 | 4/1999 |

* cited by examiner

METHOD FOR DETERMINING THE DISPLACEMENT OF A RADIAL PISTON MACHINE

This application is a National Stage completion of PCT/EP2010/068392 filed Nov. 29, 2010, which claims priority from German patent application serial no. 10 2009 054 876.9 filed Dec. 17, 2009.

FIELD OF THE INVENTION

The invention relates to a method for determining the displacement of a radial piston machine.

BACKGROUND OF THE INVENTION

It is known that the flow rate of a radial piston machine, i.e., of a radial piston motor or a radial piston pump, depends directly on the displacement, which can be changed by adjusting the eccentricity. The present displacement would be suitable as a reference input for controlling the flow rate, but neither the displacement nor the presently set eccentricity can be measured.

A method for controlling a hydrostatic drive is known from DE 10 2007 003 800 B3, wherein the present displacement of a hydraulic motor is derived from the present electrical adjusting current by means of an adjusting current characteristic curve.

A device for determining the displacement of an adjustable radial piston motor having cylinders supported in a pivoting manner is known from DE 10 2004 048 174 A1 of the applicant. A rotary encoder that measures the pivoting angle of the cylinders, which is proportional to the present displacement, is provided in order to determine the displacement.

A non-contact rotary sensor for an adjustable radial piston motor is known from DE 10 2006 043 291 A1 of the applicant. The rotary sensor is intended to detect the present rotation angle or pivoting angle of a cylinder of the radial piston motor, wherein the rotation angle is proportional to the presently set displacement of the radial piston motor.

SUMMARY OF THE INVENTION

The object of the present invention is that of improving a method of the type initially described so that the present displacement of the radial piston machine can be determined as simply and accurately as possible.

According to the invention, the pivoting angle $\beta$ of the cylinders is measured while the radial piston machine is running and the eccentricity, and hence the displacement, are calculated therefrom. Therefore, the presently determined displacement can be used as a reference input in a control process for controlling the flow rate of the radial piston machine. The result is fast and accurate control. The invention is based on the idea that a mathematical relationship exists between the pivoting angle $\beta$, the rotation angle $\alpha$ of the drive shaft, and the set eccentricity e. Because the displacement itself and the eccentricity cannot be measured or can be measured only poorly during the operation of the radial piston machine, only the pivoting angle is measured according to the invention, and the displacement is calculated from the pivoting angle by using the mathematical relationship. For the pivoting angle $\beta$ as a function of the rotation angle $\alpha$, a function similar to a sine curve results in which the maxima and minima are shifted relative to the sine curve. The zero points of the pivoting angle $\beta$ are reached at the top dead center and the bottom dead center of the radial piston.

According to an advantageous method variant, the pivoting angle $\beta$ is measured at defined times $t_n$, wherein a rotation angle $\alpha_n$ of the drive shaft is associated with each time $t_n$. By associating the rotation angle with the measurement time and thus with the measured pivoting angle $\beta_n$, the eccentricity e can be calculated.

According to an additional preferred method variant, a number z of pulses is produced per revolution of the drive shaft in order to define the $t_n$. The occurrence of the pulses triggers the measurement of the pivoting angle $\beta_n$. Therefore, an adequate number z of measured values for the pivoting angle $\beta$ and values of the present displacement calculated therefrom are obtained for each revolution of the drive shaft.

According to an additional advantageous method variant, a zero position is associated with the drive shaft. The zero position corresponds to the top dead center of the eccentric and is determined anew after each pass, i.e., after a rotation angle of 360°.

According to an additional advantageous method variant, the direction of rotation of the drive shaft can be determined from the course of the function of the pivoting angle $\beta$, i.e., from the relative position of the pivoting angle maxima and minima with respect to $\pi/2$ and $3\pi/2$: If the rise of the pivoting angle $\beta$ from the minimum to the maximum is steeper than the fall from the maximum to the minimum, the direction of rotation is clockwise. In deviating cases, the direction of rotation is counterclockwise. Knowledge of the direction of rotation is essential to the calculation of the displacement.

BRIEF DESCRIPTION OF THE DRAWINGS

An example embodiment of the invention is illustrated in the drawings and is described in greater detail below, wherein additional features and/or additional advantages may be derived from the drawings or the description. The drawings show FIG. 1 a schematic representation of an adjustable radial piston motor FIG. 2 a schematic representation of the geometric relationships for a cylinder of a radial piston motor FIG. 3 the course of the pivoting angle $\beta$ as a function of the rotation angle $\alpha$

DETAILED DESCRIPTION OF THE PREFERRED EMBODIMENTS

Figure 1:
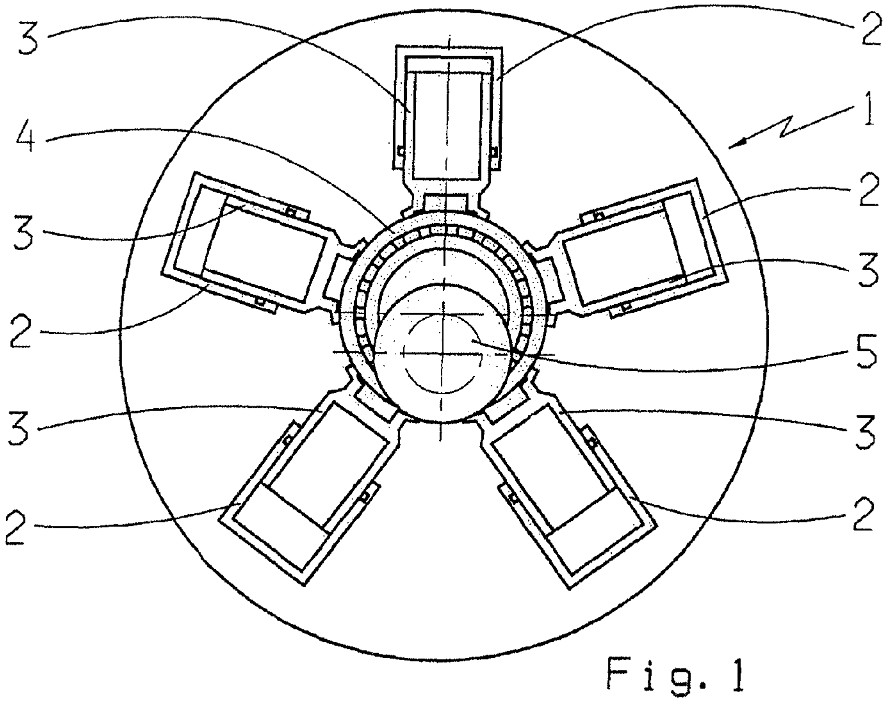
Fig. 1 (PRIOR ART)

FIG. 1 shows a radial piston machine designed as a radial piston motor 1 according to the prior art. Five cylinders 2 are arranged in a star shape and are supported in a pivoting manner (not depicted). A piston 3, which is supported by means of a shoe against a stroke ring 4 in a sliding manner, is associated with each cylinder 2. The stroke ring 4 is driven by an eccentric 5 and therefore causes the different stroke phases depicted in the drawing. The pivoting support of the cylinders, which is not depicted in FIG. 1, proceeds from the document DE 10 2004 048 174 A1 initially mentioned, which is hereby incorporated by reference in full in the disclosure of this patent application.

Figure 2:
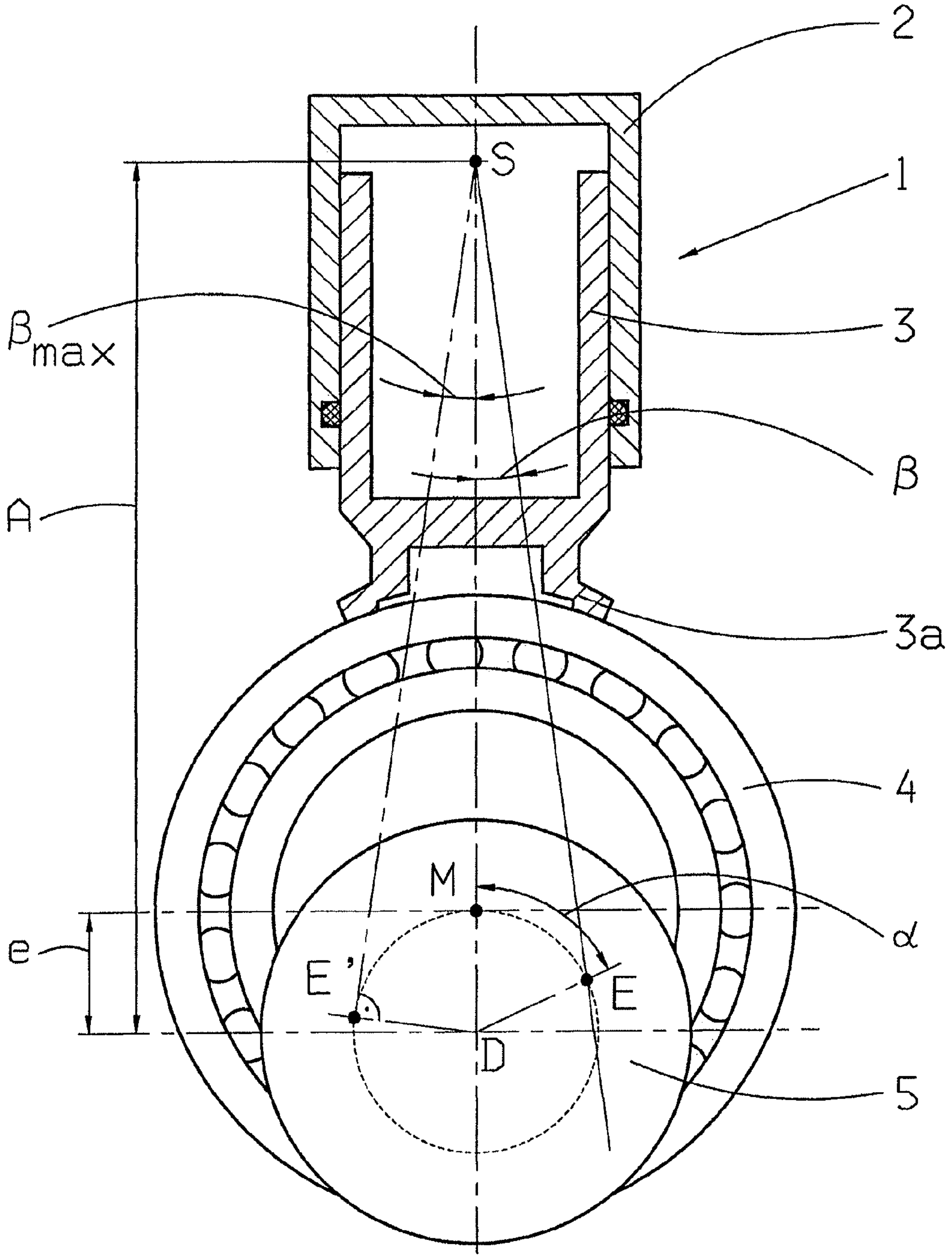

FIG. 2 shows a cylinder 2 from FIG. 1 in schematic representation, wherein identical reference numbers are used for identical parts. The cylinder 2 is supported in a housing, which is not depicted, in such a way that the cylinder can be pivoted about an axis passing through the point S. The piston 3, which is arranged in the cylinder 2 in a sliding manner, is supported by means of the shoe 3*a* thereof on the stroke ring 4 in a sliding manner, the stroke ring being driven by the eccentric 5. The eccentric 5 has a rotation point D, through which the axis of a drive shaft (not depicted) that drives the eccentric 5 passes. The stroke ring 4 has a center point M; the distance of the rotation point D from the pivot point S is labeled A. The distance of the center point M from the rotation point D is referred to as the deflection or eccentricity e. The deflection e can be adjusted in order to change the displaced volume or displacement of the radial piston motor. The pivoting angle of the cylinder 2 is labeled β, and the rotation angle of the drive shaft about the rotation point D, starting from the top dead center of the piston 3, is labeled α. For the rotation angle α included in the drawing, a position of the eccentric referred to as point E results, at which position the cylinder 2 was pivoted by the angle β. The following relationship can be derived from the triangle DSE:

$$\tan \beta = e \cdot \sin \alpha / (A + e \cdot \cos \alpha)$$

From this relationship, it is clear that the pivoting angle β depends on both the rotation angle α and the set eccentricity e.

Figure 3:
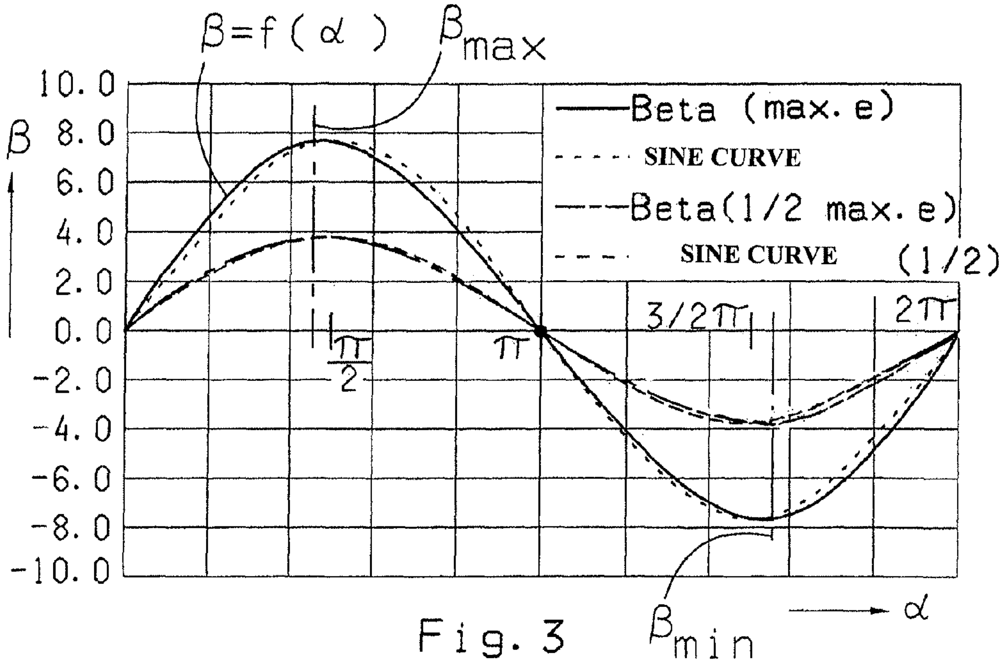

The function of the pivoting angle β is plotted in FIG. 3 and depicted in solid lines, namely one for a maximum eccentricity e and one for half the maximum eccentricity (e/2). For comparison, corresponding sine curves are included in the drawing in dashed lines. It is clear that the zero crossings are identical, but the maxima and minima are not. The maximum for the pivoting angle β occurs before π/2, and the minimum for β occurs after the minimum of the sine curve.

In the graph, the maximum is labeled as $\beta_{max}$ and the minimum is labeled as $\beta_{min}$. From the course of the function depicted, i.e., from the relative position of $\beta_{max}$ and $\beta_{min}$ with respect to π/2 and 3π/2, the direction of rotation of the drive shaft can be derived as follows: The direction of rotation is clockwise if the rise of the pivoting angle β from the minimum to the maximum is steeper than the fall from the maximum to the minimum; in all other cases, the direction of rotation is counterclockwise. Clockwise is defined as d=1, and counterclockwise is defined as d=−1.

From the values for β and α determined in this way, the deflection or eccentricity e can be calculated according to the aforementioned tan function. There is a definite relationship for the displacement v of the radial piston motor 1 and the deflection e:

$$v = f(e)$$

Therefore, if the value of the deflection e is known, the displacement v is known.

The maximum of the pivoting angle $\beta_{max}$ occurs in FIG. 2 (left half) when the ray of the angle β is tangent to the circle of radius e about D at the point E'. In this case, the right triangle DE'S and the following simple relationship result:

$$\sin \beta_{max} = e/A$$

One of the cylinders 2 is equipped with an angular sensor (not depicted), which measures the pivoting angle β, as is known from the prior art initially mentioned. The zero point of the pivoting angle β is reached at the upper end position and the lower end position of the piston (top dead center, bottom dead center). A pulse generator (not depicted) produces a number z of pulses in a pulse detector per complete revolution of the drive shaft. It is not necessary for z to be an integer. This is the case, e.g., if the pulse generator is not arranged directly on the drive shaft, but rather is driven by means of a gear drive having a non-integer transmission ratio. For each pulse n, the time $t_n$ of the detection thereof is stored. In addition, each pulse triggers a measurement of the pivoting angle β. This measured value is associated with the trigger time $t_n$: $\beta_n = \beta(t_n)$.

Because the pulses are generally not associated with fixed angular positions of the drive shaft, the zero position is determined anew for each revolution.

In the vicinity of the zero crossings, the pivoting angle $\beta_n$ is too small for a usable accuracy. This is additionally aggravated if the eccentric is deflected only slightly, i.e., if the deflection e assumes small values. This problem is solved according to the invention as follows: If the rotational speed of the drive shaft is large relative to the adjusting speed of the eccentric, only the extreme values of β of the last revolution of the drive shaft can be used and e can be determined by using the definite relationship $\beta_{max}(e)$. This relationship is, as mentioned above:

$$\sin \beta_{max} = e/A$$

In other words, the maximum pivoting angle $\beta_{max}$ depends only on the geometry, i.e., the present deflection e.

REFERENCE CHARACTERS

1 radial piston motor
2 cylinder
3 piston
3*a* shoe
4 stroke ring
5 eccentric
S center of gravity of cylinder
D rotation point of eccentric
E, E' eccentric position
M center point of stroke ring
A distance
e eccentricity
α rotation angle
β pivoting angle
$\beta_{max}$ maximum
$\beta_{min}$ minimum

The invention claimed is:

1. A method of determining displacement of a radial piston machine (1) having adjustable eccentricity (e), the radial piston machine (1) having cylinders (2) arranged in a pivoting manner and having a drive shaft that drives an eccentric (5), the method comprising the steps of:

measuring, with angular sensors, a pivoting angle (β) of the cylinders (2) with respect to an axis formed by a pivoting point of the cylinder and a rotation point of the eccentric; and calculating, with the radial piston machine, the eccentricity (e) of the eccentric and hence the displacement (v) of the radial piston machine from the measured values of the pivoting angle (β) of the cylinders, and determining, with the radial piston machine, a direction of rotation of the drive shaft from a course of a function (β=f(α)) of the pivoting angle (β), with the pivoting angle (β) being a function of a rotation angle (α) of the drive shaft.

2. The method according to claim 1, further comprising the step of measuring the pivoting angle (β) of the cylinders with the angular sensor at defined times ($t_n$), and associating the rotation angle ($\alpha_n$) of the drive shaft with each of the defined times ($t_n$).

3. The method according to claim 2, further comprising the step of producing, with a pulse generator, a number (z) of pulses in a pulse detector per revolution of the drive shaft to define the times ($t_n$) at which the pivoting angle is measured by the angular sensor.

4. The method according to claim 3, further comprising the step of corresponding a zero position with a top dead center of the eccentric (5) associated with the drive shaft, and determining the zero position anew after each revolution of the drive shaft.

5. The method according to claim 1, further comprising the step of calculating the eccentricity (e) with only at least one of a maximum value and a minimum value of the pivoting angle (β) of a revolution of the drive shaft.

6. The method according to claim 5, further comprising the step of calculating a present eccentricity (e) from the maximum value of the pivoting angle.

7. The method according to claim 1, further comprising the step of defining the direction of rotation as clockwise if a rise of the pivoting angle (β) from a minimum pivoting angle ($\beta_{min}$) to a maximum pivoting angle ($\beta_{max}$) is steeper than a fall from the maximum pivoting angle ($\beta_{max}$) to the minimum pivoting angle ($\beta_{min}$), and defining the direction of rotation as counterclockwise for a deviating course of the function.

* * * * *